United States Patent [19]

Shannon

[11] Patent Number: 5,134,883

[45] Date of Patent: Aug. 4, 1992

[54] PENDULUM-TYPE ACCELEROMETER

[76] Inventor: E. Paul Shannon, Rte. 2, Box 249, Killen, Ala. 35645

[21] Appl. No.: 589,329

[22] Filed: Sep. 27, 1990

[51] Int. Cl.$^5$ .............................................. G01P 15/08
[52] U.S. Cl. .................... 73/517 R; 73/170 A; 73/178 R; 33/366; 33/396
[58] Field of Search ............ 73/170 A, 178 R, 178 H, 73/178 T, 516 R, 517 R; 33/366, 396

[56] References Cited

U.S. PATENT DOCUMENTS

| | | | |
|---|---|---|---|
| 2,633,028 | 3/1953 | Fillebrown | 73/517 R |
| 2,979,959 | 4/1961 | Clurman | 73/516 R |
| 3,372,386 | 3/1968 | Klinger | 73/517 R |
| 3,867,844 | 2/1975 | Shimizu et al. | 73/517 R |
| 4,297,883 | 11/1981 | Shannon | 73/504 |
| 4,316,389 | 2/1982 | Shannon | 73/504 |
| 4,498,341 | 2/1985 | Breitbach et al. | 73/517 R |
| 4,984,459 | 1/1991 | Shannon | 73/178 R |

Primary Examiner—Hezron E. Williams
Assistant Examiner—Craig Miller
Attorney, Agent, or Firm—Hugh D. Jaeger

[57] ABSTRACT

A pendulum-type accelerometer for use on trucks, cranes, airplanes, and boats as a multipurpose sensor. A cylinder with a damping fluid includes four equally spaced coils in a base of the cylinder and a pendulum suspended from a top of the cylinder which swings over the coils. Coils connected to a signal processing system which provides an angular momentum and banking signal and an acceleration and deacceleration or grade indicator signal.

2 Claims, 6 Drawing Sheets

PENDULUM-TYPE ACCELEROMETER

BACKGROUND OF THE INVENTION

1. Field of the Invention

The present invention pertains to an angular momentum and banking indicator and acceleration-deacceleration grade indicator system.

2. Description of the Prior Art

There has been a long standing need for an economical system which will indicate angular momentum and banking or acceleration-deacceleration grade information. Prior art systems have usually been limited to those applied to the aeronautical markets which are expensive to purchase, expensive to maintain and highly impractical for the ordinary individual to purchase.

One particular example of a system which has always been in demand is a tilt indicator for a crane. Another system which is in demand is a braking indicator for vehicles. Another system which has been in demand is an acceleration-deacceleration for trucks. Each of these various systems for these types of transportation industries have not been produced or sold on a cost effective basis and readily available.

The present invention overcomes the disadvantages by providing a system which is unique, novel and cost effective which fulfills a long standing need.

SUMMARY OF THE INVENTION

The general purpose of the present invention is to provide an angular momentum and banking indicator and acceleration-deacceleration and grade indicator which can be used in such transportation purposes such as trucks, cranes, trains, and ships. The purpose of the system is to provide an indication of either momentum, banking, acceleration, deacceleration or grade information which is obtained through a signal processing circuit. The system can be easily utilized by any individual, is easy to install by any individual and is cost effective.

According to one embodiment of the present invention there is provided an angular momentum and banking indicator and acceleration-deacceleration grade indicator including a cylinder, a plurality of spaced coils in the base of the cylinder, a pendulum suspended on a flexible wire or string from a top of the cylinder and over five coils, a damping fluid within the cylinder, and the four of the five coils connected to a single processing system for processing the signal indicating one of the modes from the group of momentum banking acceleration-deacceleration and grade.

Significant aspects and features of the present invention include an angular momentum and banking indicator and acceleration-deacceleration grade indicator system which provides an indicator which reads out a numerical display for the mode of operation. Usually an analog and meter display is utilized as a preferred display for the system. Any other types of displays can be utilized such as a LED light bar display, a digital readout or other suitable or appropriate graphics.

Having thus described the preferred embodiments of the present invention, it is a principal object hereto to provide an angular momentum and banking indicator and acceleration-deacceleration grade indicator system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
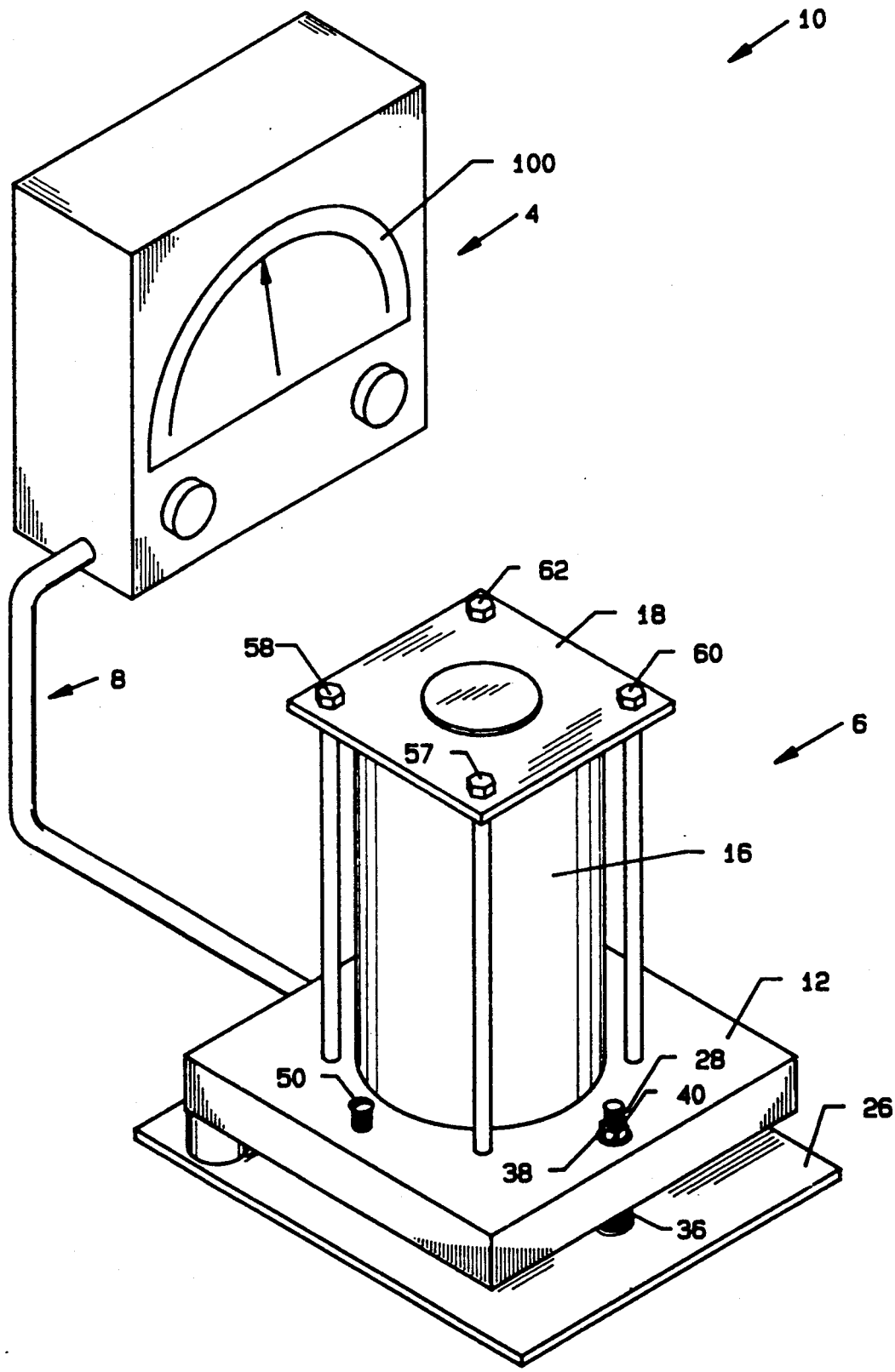
FIG. 1 illustrates front view of the angular momentum and banking indicator and acceleration-deacceleration grade indicator system, the present invention.

FIG. 1 illustrates a perspective view of an angular momentum and banking indicator and acceleration-deacceleration grade indicator system 10, herein known also as the grade indicator system 10. The grade indicator system 10 includes an indicator device 4, a sensing assembly 6, and a connecting cord 8 therebetween. The major components of the sensing assembly 6 includes a base 12, a cylindrical housing 16, a rectangular top 18 in alignment with each other and secured to a platform 26.

Figure 2:
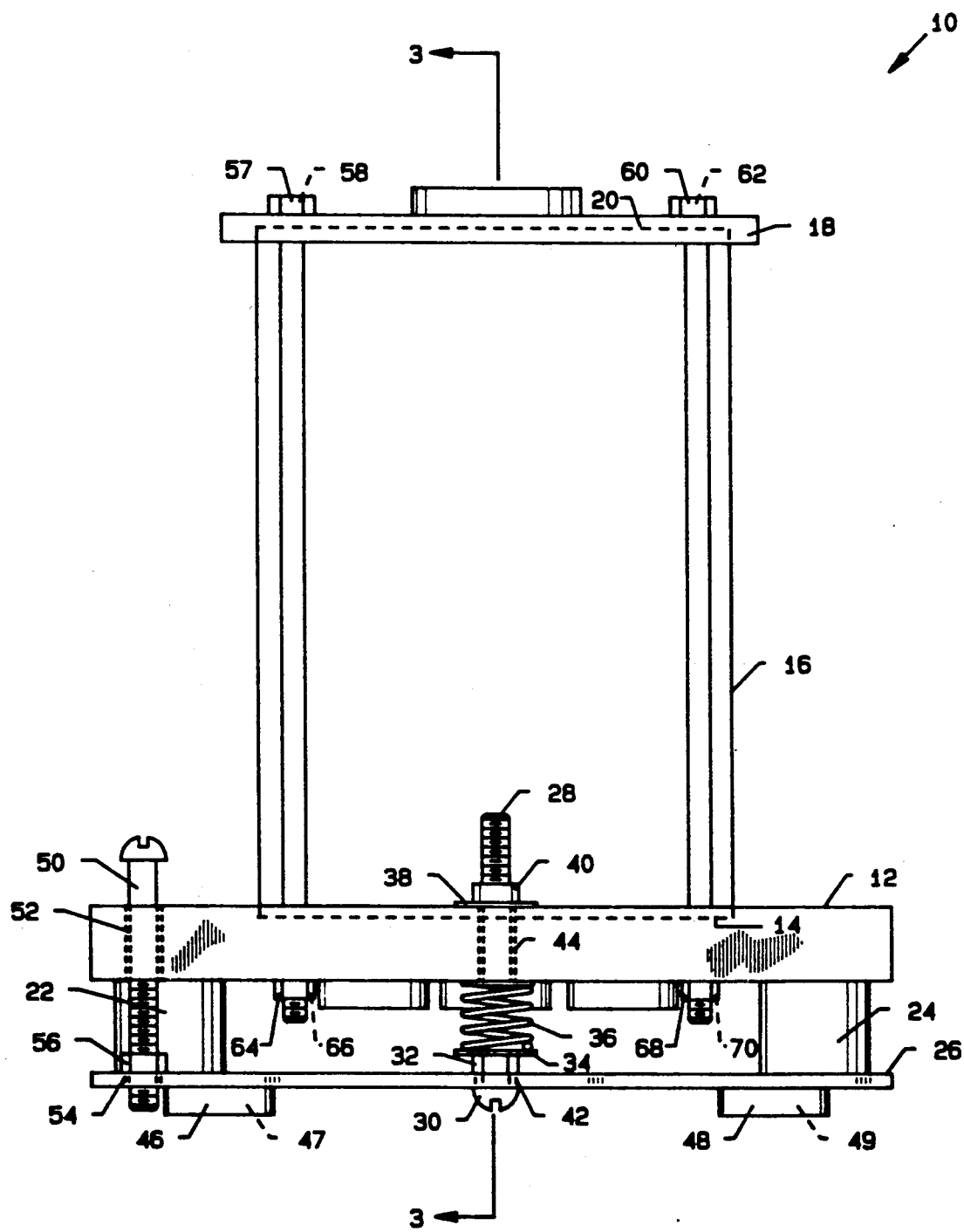
FIG. 2 illustrates a front view of the sensing assembly of the momentum and banking indicator and acceleration-deacceleration grade indicator system.

FIG. 2 illustrates a front view of the sensing assembly 6 of the angular momentum and banking indicator and acceleration-deacceleration grade indicator system 10 including a base 12 with a circular dished out area 14 for supporting and sealing the cylindrical housing 16 and a top 18 including a circular dished out area 20 for sealing against the cylindrical housing 10. Two rear feet 22 and 24 support the base 12 with respect to a platform 26. A forward machine screw 28 including a head 30, a nut 32, a washer 34, a spring 36, a washer 38 and a nut 40, provides an adjustable forward support. The machine screw 28 extends through holes 42 and 44 a platform 26 and base 12 respectively. The spring biased screw assembly including machine screw 28 provides adjustment for the angular momentum and banking indicator of the system. Feet 46, 47, 48 and 49 secure to the underside of the platform 26. A machine screw 50 extends through hole 52 and threaded hole 54, and includes an adjustment nut 56. Bolts 57, 58, 60 and 62, on which are mounted nuts 64, 66, 68 and 70, extend through the top 18 and through the base 12 respectively to secure the top 18, the cylindrical housing 16 and the base 12 together.

Figure 3:
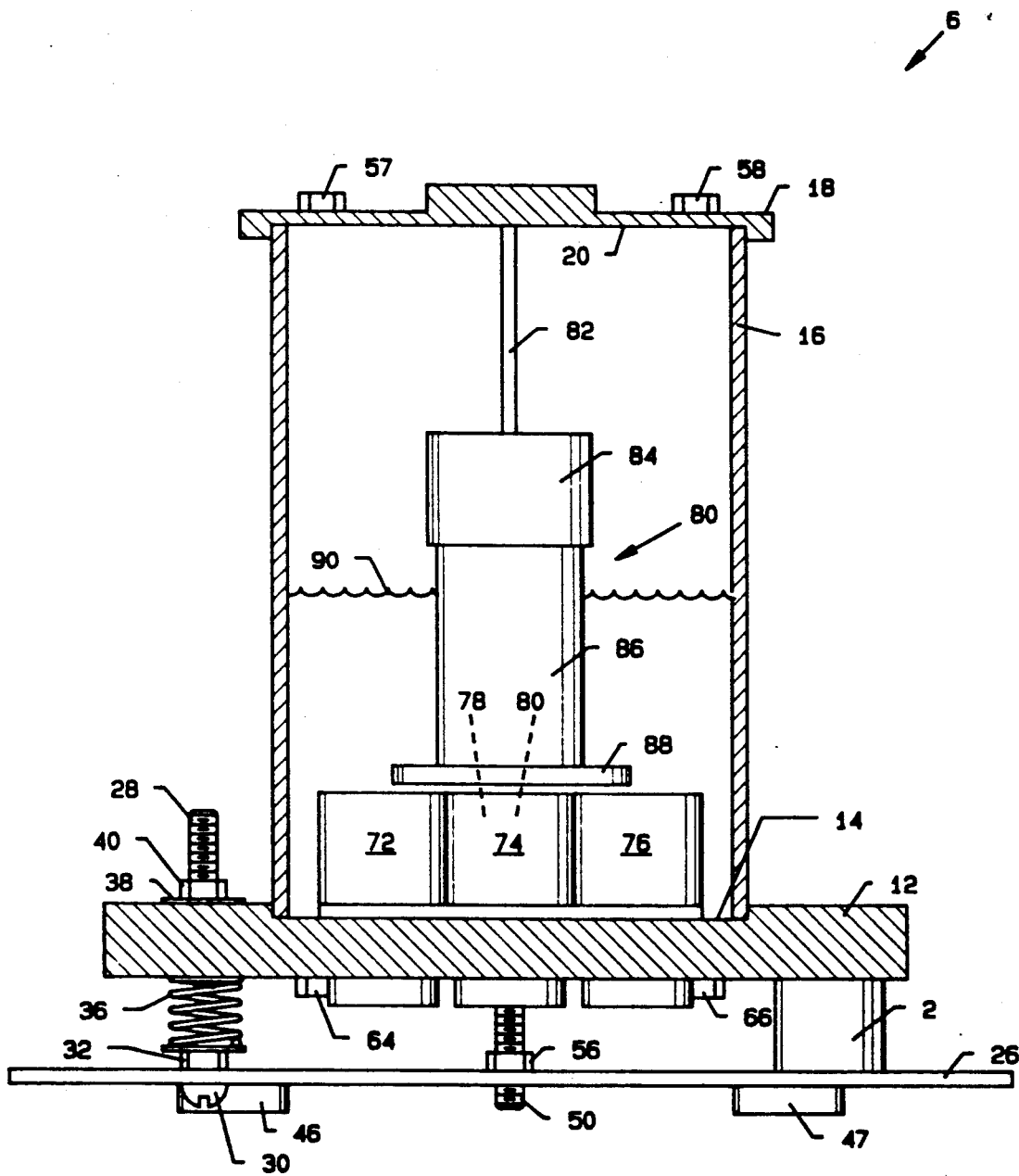
FIG. 3 illustrates a partial cross section view of the sensing assembly along viewing line 3—3 of FIG. 2.
Figure 4:
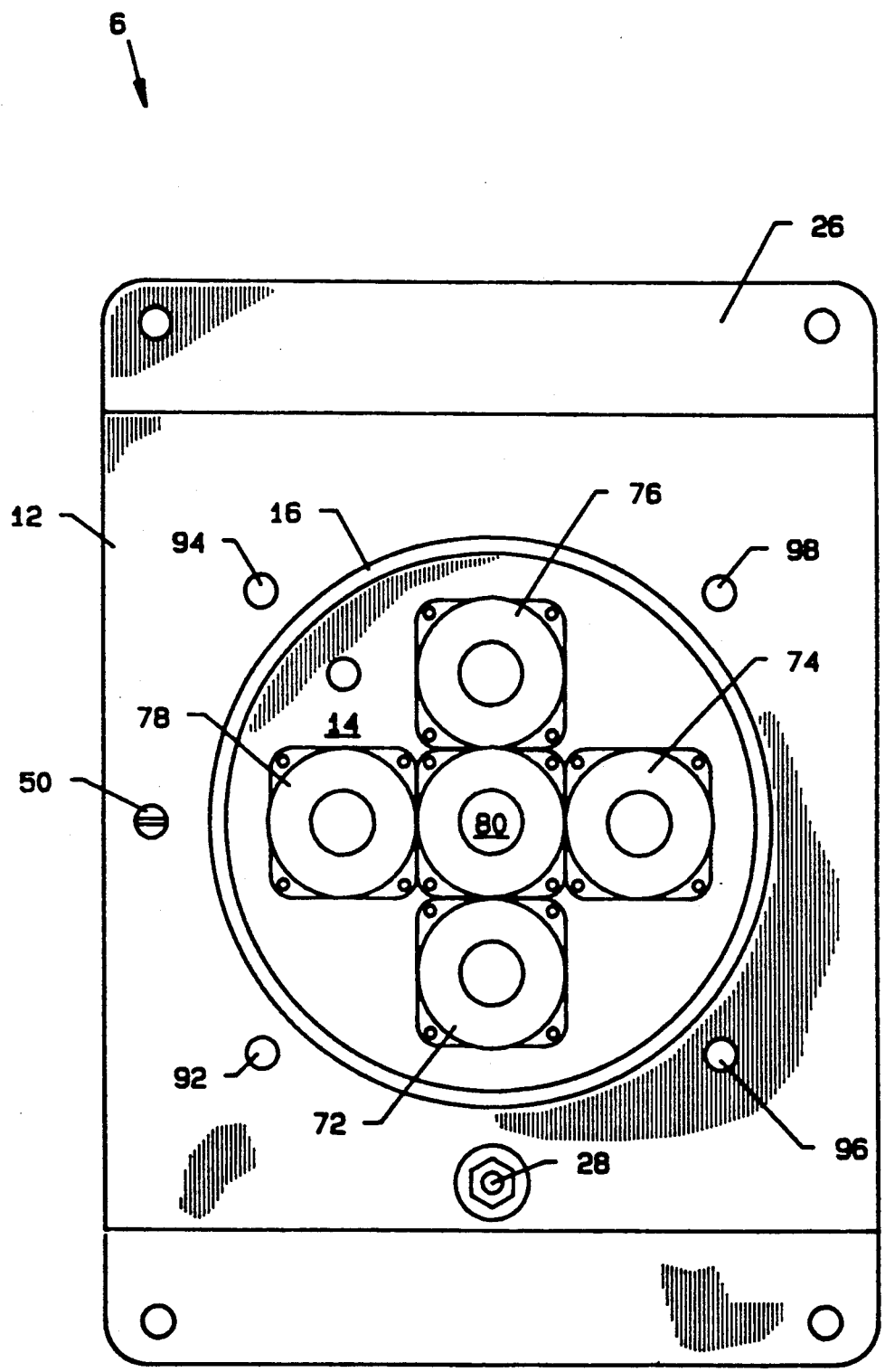
FIG. 4 illustrates a top view of the sensing assembly of the angular momentum and banking indicator and acceleration-deacceleration grade indicator system with the top and pendulum removed.

FIG. 3 illustrates a partial cross section view of the sensing assembly 6 along viewing line 3—3 of FIG. 2 where all numerals correspond to those elements previously described. A plurality of coils including coils 72, 74, 76, 78 and 80 align on the base 12 and in the dished out area 14 of the base 12. The bottoms of the coils 72–80 align in holes in the base 12 and protrude from the bottom of the base 12. The alignment of the coils with respect to each other is illustrated in FIG. 4. A pendulum 80 is suspended by a flexible wire 82 or other flexible like means from the top 18. The pendulum 80 includes a sleeve 84 connected to the wire 82, a cylindrically shaped main body 86 which frictionally engages or otherwise affixes within the sleeve 84 and a pendulum bottom base 88 secured to and aligned with the main body 86. A damping fluid 90 such as oil is added to the interior of the cylindrical housing to dampen the movement and motion of the pendulum 80 over the coils 72, 74, 76, 78 and 80. The bottom base of the pendulum can be arched in lieu of being flat. The design and shape of the pendulum is not critical as long as the pendulum base is of sufficient area to cover the coil areas during one of the modes of operation.

FIG. 4 illustrates a top view of the sensing assembly 6 with the top 18 removed and the pendulum 80 removed including five spaced coils 72, 74, 76, 78 and 80 and where all numerals correspond to those elements previously described.

Figure 5:
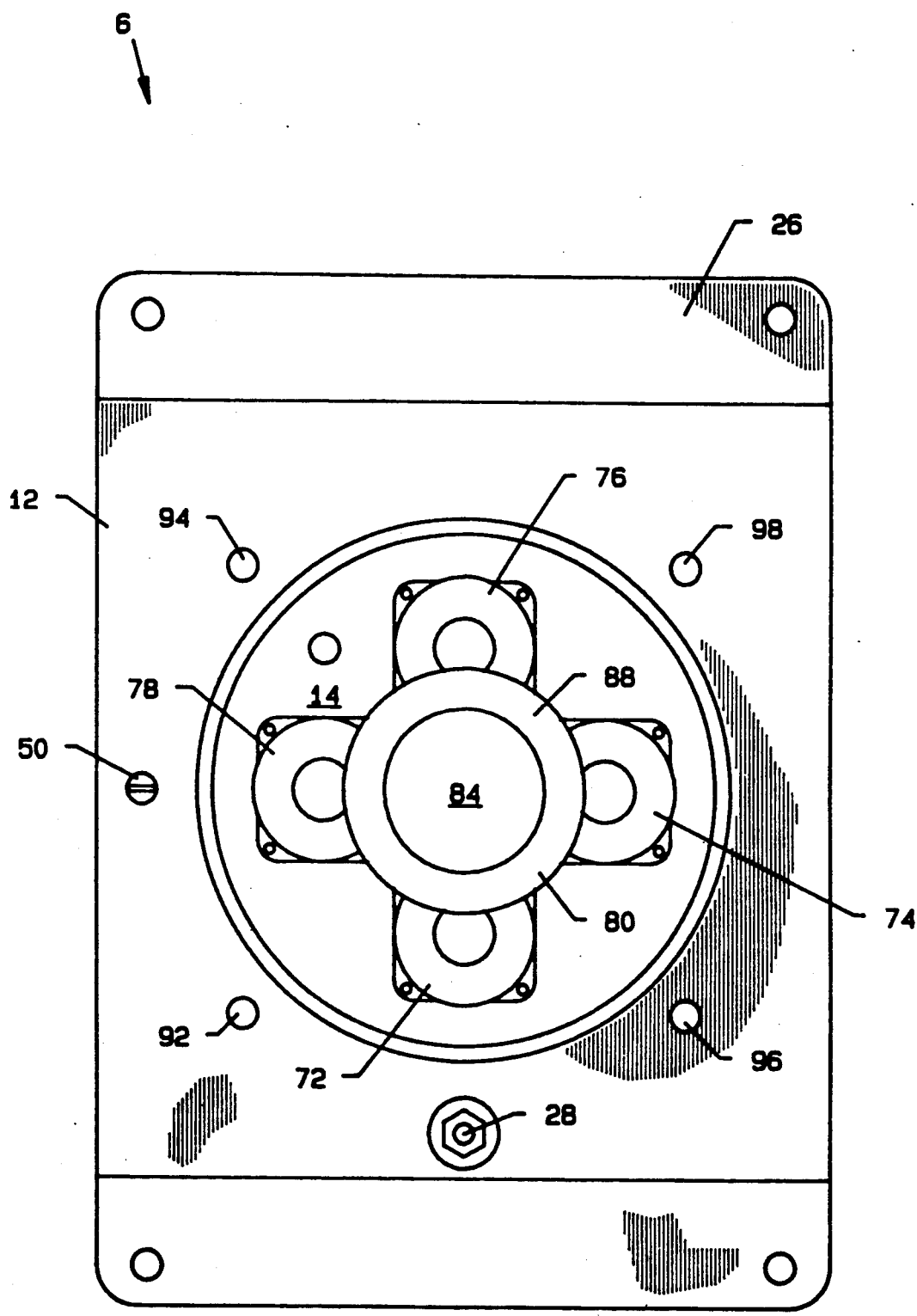
FIG. 5 illustrates a top view of the sensing assembly of the momentum and banking indicator and acceleration-deacceleration grade indicator system and the pendulum.

FIG. 5 illustrates a top view of the sensing assembly with the top 18 removed. Particularly illustrated is the alignment of the pendulum 80 over the coils 72, 74, 76, 78 and 80. As the pendulum 80 traverses across the coils 72, 74, 76, 78 and 80, currents are sent through the rectifiers 104, 106, 108 and 110 and displayed on the meters 100 and 102.

Figure 6:
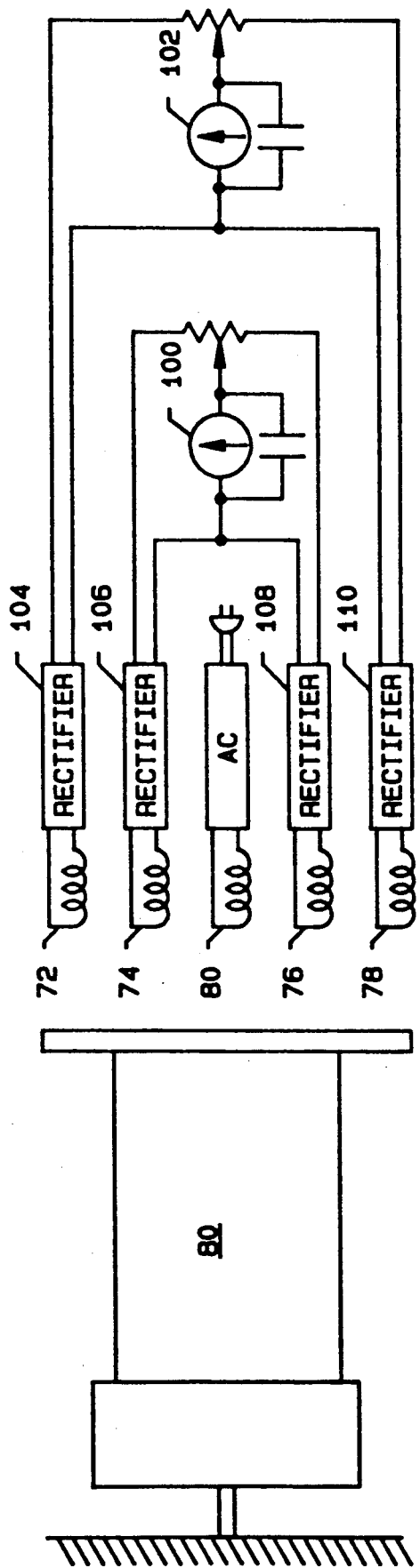
FIG. 6 illustrates an electrical circuit schematic diagram of the angular momentum and banking indicator and acceleration-deacceleration grade indicatory system.

FIG. 6 illustrates an electrical circuit schematic diagram of the four coils 72, 74, 76 and 78 connected to display meters 100 and 102. In an alternative mode, a switch could be used to switch between the coils to indicate the appropriate mode of operation on an indicator meter such as on the indicating device 4 of FIG. 1 depending upon the operator's selection.

MODE OF OPERATION

The mode of operation for the angular momentum and banking indicator 10 which is adjusted through the screw 50 and the acceleration and deacceleration grade indicator 10 which is adjusted through the screw assembly 28 provides adjustment for the unit which can be appropriately installed in a vehicle including trains, plains, ships, cranes or any other suitable vehicle which moves in any direction and is not limited to movement across a surface. This would include planes, cranes, and ships. The grade indicator system 10 requires minimal installation such as securing to a base of a vehicle and then placing the display in view of an operator.

The grade indicator system 10 is particularly useful for truck drivers such as tractor-trailer drivers to view acceleration and deacceleration as well as banking around curves so as to appropriately time their shifting of the gears as well as braking.

The grade indicator system 10 is also useful for crane operators indicating the degree of tilt of the crane.

Preferred use of this system may very well be in trucks and trains.

Another use of the grade indicator system 10 is a rail lubricator for trains so that the inside rails on a curve are lubricated during a turning action. Rail lubrication systems have become important because of the high cost of energy as well as the time, motion and expense in replacing rails because of extended wear.

Various modifications can be made to the present invention without departing from the apparent scope hereof.

I claim:
1. An angular momentum and banking indicator and acceleration-deacceleration grade indicator system comprising:
   a. a housing having a top, a base, and a generally cylindrical wall;
   b. a center coil on the base of said housing for attachment to altering current;
   c. a plurality of four sensing coils symmetrically spaced about said center coil on the base of said housing;
   d. a pendulum suspended from the top of said housing over and about all of coils, having a rest position over the center coil;
   e. signal processing means connected to said sensing coils for sensing deviation of the pendulum from the rest position; and,
   display means connected to said signal processing means for displaying said deviation.
2. Apparatus for detecting deflection from a rest state comprising:
   a. a housing;
   b. a pendulum suspended from the housing;
   c. a central power coil connected to a source of alternating current;
   d. a set of at least four sensing coils symmetrically spaced about the center power coil;
   e. the pendulum having a rest state over the center power coil and having a deflected state wherein it moves from vertical;
   f. each sensing coil being connected to a rectifier for sensing magnetic flux through the coil; and,
   g. display means electrically connected to the rectifiers for displaying deviation of the pendulum from vertical based upon the signals from the rectifiers.

* * * * *